United States Patent Office 2,848,364
Patented Aug. 19, 1958

2,848,364

PRODUCTION OF NOVEL ACETOACETANILIDES, AND ACARICIDES PRODUCED THEREFROM

Henry Martin, Zurich, and Ernst Habicht, Schaffhousen, Switzerland, assignors to Cilag Limited, Schaffhousen, Switzerland, a Swiss company No Drawing. Application March 28, 1956
Serial No. 574,396

Claims priority, application Switzerland March 30, 1955

3 Claims. (Cl. 167—30)

This invention relates to novel acetoacetanilides, their production and acaricides produced therefrom.

A large number of anilides of acetoacetic acid are already known (Beilstein 12, 1 Erg. Werk, pages 648, 317, 388; Beilstein 13, 1 Erg. Werk, pages 117, 177, 227). N-alkyl-substituted anilides of acetoacetic acid have also been described in the literature [cf. J. Am. Chem. Soc. 67, page 1970 (1945)].

The acetoacetanilides of the invention are compounds of the formula

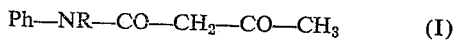

$$Ph-NR-CO-CH_2-CO-CH_3 \quad (I)$$

in which Ph is a phenyl radical substituted by at least one lower alkyl or alkoxy radical or halogen atom and R is a lower alkyl or alkenyl radical. These new anilides have valuable acaricidal properties.

Examination of the entire class of substances has surprisingly shown that anilides of acetoacetic acid which are substituted in the phenyl by alkyl, alkoxy and/or halogen but which are not substituted at the nitrogen, and anilides which are not substituted in the phenyl but are substituted at the nitrogen by alkyl or alkenyl, do not have these properties.

As already mentioned, the novel acetoacetanilides are effective agents for the extermination of mites. In addition, they have valuable anaesthesising properties. They are usually only very sparingly soluble in water, but dissolve readily in oils and fats.

The novel anilides are obtained according to the invention by reacting anilines of the formula

$$Ph-NHR \quad (II)$$

with functional reactive derivatives of acetoacetic acid for example alkyl esters of acetoacetic acid or diketene.

The invention also provides a valuable acaricidal composition comprising an acetoacetanilide as defined above dispersed in a solvent or a solid, semi-solid or liquid diluent or carrier, the solvent, diluent or carrier being non-toxic with respect to plants and warm-blooded animals.

The forms of application depend entirely on the purposes of use. The active compounds can be used in suitable solvents or diluents, in the form of emulsions or dispersions, on suitable solid or semi-solid carrier substances, in ordinary or synthetic soaps, detergents or dispersion media, if desired together with compounds having acaricidal, insecticidal, ovicidal, fungicidal and/or bactericidal effects, or together with inactive additives.

Solid carrier substances which are suitable for the preparation of preparations in powder form include various inert, porous and pulverous distributing agents of inorganic or organic nature, such as for example tricalcium phosphate, calcium carbonate, in the form of prepared chalk or ground limestone, kaolin, bole, bentonite, talcum, kieselguhr and boric acid; powdered cork, sawdust, and other fine pulverous materials of vegetable origin are also suitable carrier substances.

The active components are mixed with these carrier substances, for example by being ground therewith; alternatively the inert carrier substance is impregnated with a solution of the active component in a readily volatile solvent and the solvent is thereafter eliminated by heating or by filtering with suction at reduced pressure. By adding wetting and/or dispersing agents, such as pulverous preparations can also be made readily wettable with water, so that suspensions are obtained.

Inert solvents used for the production of liquid preparations should preferably not be readily inflammable and should be as far as possible odorless and as far as possible non-toxic to humans and animals in the revelant surroundings.

Solvents suitable for this purpose are high-boiling oils, for example of vegetable origin, and lower-boiling solvents with a flash point of at least 30° C. such as for example isopropanol, hydrogenated napthalenes and alkylated napthalenes.

It is of course also possible to use mixtures of solvents. Solutions can be prepared in the usual way, if necessary with assistance of solution promoters. Other liquid forms which can be used consist of emulsions or suspensions of the active component in water or suitable inert solvents, or also concentrates for preparing such emulsions, which can be directly adjusted to the required concentrate at the place of use by dilution to the required concentration. For this purpose, the active component is for example mixed with a dispersing or emulsifying agent. The active component can also be dissolved or dispersed in at suitable inert solvent and mixed simultaneously or subsequently with a dispersing or emulsifying agent. Emulsions or suspensions ready for use are obtained by such a concentrate being diluted, for example with water. Clear and entirely stable aqueous solutions (emulsoids) can be obtained with suitable concentration and mixing ratios of active component, emulsifier and water.

For cosmetic purposes, it is possible to use semi-solid carrier substances of a cream, ointment, paste or wax-like nature, into which the active substance can be incorporated, if necessary with the aid of solution promoters and/or emulsifiers. Such semi-solid preparations usually constitute emulsions. Vaseline and other cream bases are examples of semi-solid carrier substances. The active component can consist of one or more compounds of the formula indicated. It can, moreover, also be used in combination with other acaricidal, insecticidal, ovicidal, fungicidal or bactericidal substances, whereby combined preparations are obtained with a large effective range.

Furthermore, it is possible for the active component to be used in the form of aerosols. For this purpose, the active component is dissolved or dispersed, if necessary with the aid of suitable inert solvents as carrier liquid, in a solvent, such as difluordichloromethane, which at atmospheric pressure boils at a temperature lower than room temperature. In this way, solutions under pressure are obtained which, when sprayed, yield aerosols which are particularly suitable for attacking mites in closed chambers, in grain silos and other storage rooms.

Examples of other additives which can be admixed with the said preparations are: adhesive substances, such as casein, fat acid salts, size, resins, fats, protein decomposition products; wetting agents, solution promoters, dyestuffs, odorous substances; dust-bonding agents in the case of pulverous preparations.

By suitable choice of the various dispersion media and additives, it is readily possible to modify the composition and consequent properties of the agents to make them suitable for any given purpose.

The mite-exterminating agents can be applied by conventional methods. The acarida or the material to be treated or to be protected against attack by acarida can be treated with the above-described agents by dusting, sprinkling, brushing, smearing, impregnating or other suitable means.

Agents containing the above-defined active component are also very suitable for cleaning and washing warm-blooded animals infested with mites and ticks. Carrier substances which are especially suitable for this purpose of use are mentioned below.

Examples of liquid carrier substances which are suitable are paraffin oil or vegetable oils, such as olive oil, castor oil, sesame oil, glycerine and the like.

Vaseline, wool fat and the like are suitable semi-solid carrier substances.

Examples of emulsifiers which are suitable for the production of aqueous solutions and emulsions are mainly soaps, but also sulphonated fats, fatty acid esters and fatty alcohol sulphonates, quaternary ammonium compounds of relatively high molecular weight, and also non-ionic emulsifiers, such as condensation products of fatty alcohols with ethylene oxide. It is, however, also possible to produce emulsions of ointment-like consistency, for example, using stearic acid, fatty acid salts and water. For producing non-greasy ointments, it is possible to use bases of cellulose ethers or other swellable substances of animal, vegetable or synthetic origin and water, or also inorganic substances, such for example as aluminium hydroxide oil, into which the effective substances are incorporated, if necessary with the aid of emulsifiers and/or solution promoters. If desired, the preparations obtained can also be perfumed by adding odorous substances. Examples of good powdered carrier substances which are capable of adhering are talcum, starch and lactose.

Example 1

40.5 gr. of N-ethyl-o-toluidine are dissolved in 100 cc. of ethylene chloride, the solution is heated to boiling point and 26 gr. of diketene are added dropwise to the boiling solution. After boiling for 2 hours, the solvent is distilled off in vacuo and the residue distilled in vacuo. In this way, there are obtained 44 gr. of acetoacet-N-ethyl-o-toluidide, which is a colorless oil boiling at 172° C. at a pressure of 12 mm.

It is advantageous to purify the acetoacetic acid derivative by high vacuum distillation (0.05–0.02 mm. Hg), since decomposition (formation of dehydracetic acid and the initial amine) can be detected when distilling at pressures from 5 mm. upwards.

Example 2

The compound referred to in Example 1 can also be obtained in the following manner:

Equimolecular parts of N-ethyl-o-toluidine and acetoacetic acid ethyl ester are heated together in an open flask for 15 minutes at 180–200° C. The dark brown oil obtained is cooled, mixed with 1 N-caustic soda solution and vigorously shaken. The aqueous solution is separated and acidified. The anilide separating out as an oil is taken up in ether, the ether is evaporated and the residue distilled under high vacuum.

It is also possible to react acetoacetic acid ethyl ester with N-ethyl-o-toluidine in dichlorobenzene as solvent, according to the process described in German patent specification 256,621.

Example 3

29.8 gr. of N-ethyl-2-methyl-3-chloroaniline are heated at boiling point for 10 hours in 100 cc. of toluene with 16.8 gr. of diketene. The solvent is thereafter distilled off in vacuo, the residue is dissolved in ether and the ethereal solution is shaken several times with 1 N-hydrochloric acid and then with dilute potassium carbonate solution. After being dried over glowing potash, the ether is evaporated and the residue distilled in fine vacuum. In this way, there are obtained 25 gr. of acetoacet-N-ethyl-2-methyl-3-chloroanilide, boiling at 118–120° C. at a pressure of 0.01 mm.; this forms a colorless mobile oil.

Example 4

From 30 g. of N-ethyl-2-chloro-6-methyl aniline and 17 g. of diketene, there are obtained 23 gr. of acetoacet-N-ethyl-2-chloro-6-methyl-anilide, which boils at 124–126° C. at a pressure of 0.15 mm.

Example 5

If 62 gr. of N-allyl-2-chloro-6-methyl aniline and 31 gr. of diketene are reacted in the usual way, 42 gr. of acetoacet-N-allyl-2-chloro-6-methyl-anilide are obtained; this substance forms a colorless oil boiling at 125–126° C. at a pressure of 0.1 mm.

Example 6

33 gr. of N-ethyl-o-chloroaniline and 19.3 gr. of diketene are heated to boiling point for 8 hours in 100 cc. of benzene. After cooling, the benzene solution is shaken with dilute hydrochloric acid and dilute caustic soda solution; the benzene is then evaporated and the residue distilled in vacuo. Acetoacet-N-ethyl-2-chloroanilide is thus obtained as a colorless oil boiling at 160–170° C. at a pressure of 13 mm. The following are obtained in the same way as described in the examples:

| | |
|---|---|
| Acetoacet-N-allyl-4-methoxy-anilide | B. P. 126–127° C./0.1 mm. |
| Acetoacet-N-methyl-2-methoxy-anilide | B. P. 131–133° C./0.2 mm. |
| Acetoacet-N-ethyl-2,6-dimethyl anilide | B. P. 122–123° C./0.1 mm. |

Example 7

20 parts of acetoacet-N-methyl-2-methyl-3-chloroanilide are ground with 360 parts of talcum in a ball mill, then 8 parts of olein are added and grinding is continued, and finally the mixture is mixed with 4 parts of slaked lime. The powder which is formed can be sprayed satisfactorily and has good adhesive power. It can be used for dusting rooms and objects or for plant-protection purposes. An even better distribution of the active substance on the carrier material is obtained if the carrier is impregnated with a solution of the active substance, for example in alcohol or acetone, and the solvent is thereafter vaporised.

Example 8

15 parts of acetoacet-N-ethyl-o-toluidide are mixed with 22 parts of kaolin, 4 parts of the sodium salt of dibutyl-naphthalene sulphonic acid, 4 parts of casein and 5 parts of soda, and the mixture is then ground. 100 parts of finely ground chalk are then mixed therewith. The powder gives a sufficiently stable suspension in water which can be used for spraying rooms and objects infested with mites and for example also for the protection of plants.

Example 9

80 parts of acetoacet-N-6-dimethyl-2-chloroanilide are intimately triturated with 20 parts of talc. This concentrate can be used directly as a dusting powder for attacking mites, but it can also be further diluted to any desired concentrations.

Such powders, which can also be prepared with other bases, are suitable as dusting agents, for example, for combatting mites and ticks on human or animal skin. They are also suitable for attacking Dermacentor, the carrier of Rocky Mountain spotted fever, this being an infectious disease caused by Rickettsia. Powder preparations, for example with a base of powder starch, can also be used for killing mites in warehouses, for example, by the agent being admixed with the grain. Substances can if necessary be added for improving the adhesive strength, and for this purpose an addition of 4% of a liquid fatty acid is for example suitable.

Example 10

5 parts of acetoacet-N-ethyl-o-toluidide are dissolved in 95 parts of alkylated naphthalene and used as a domestic spray for the treatment of walls and floors.

Example 11

By mixing 10 parts of acetoacet-N-ethyl-2,6-dimethyl-anilide with 90 parts of olive oil, a clear solution is obtained which can be used in the veterinary and hygiene fields for killing mites and ticks. For example, it is possible to combat ear ticks (*Ornithodorus megnini*) therewith, these mainly attacking domestic animals.

Example 12

30 parts of acetoacet-N-ethyl-o-toluidide and 70 parts of a fatty acid ester sulphonate yield a clear solution, which can be diluted with any desired amount of water. There is initially formed a milky emulsion, but this changes into a stable and probably colloidal solution (emulsoid). Turkey red oil can for example be used as fatty acid ester sulphonate. The ratio between active substances and emulsifier can be varied.

Such solutions or emulsions can advantageously be used for very many different purposes. They are suitable for spraying into rooms infested with or endangered by mites; for example, they can be used against Clyciphagus (house mite), this mite living on foodstuffs, although it can also infect human beings. However, all kinds of mite-infested objects or objects which are to be protected against attack by mites can also be sprayed with the solution or can be impregnated by immersion in this solution. In analogous manner, these emulsions can also be used in the protection of plants.

Furthermore, parts of the human body or of animals infested with mites and ticks can also be externally treated with such a solution. For this purpose, the solution can be painted or smeared on. For treating small animals, it is expedient to use such a solution as a bath liquid, for example, for killing the dog tick (*Ixodes rhicinus*) on dogs and cats infested therewith.

What we claim is:

1. A method of killing mites, which comprises treating the mites with a compound of the formula

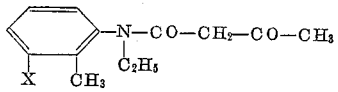

wherein X is a substituent selected from the group consisting of hydrogen and a cholorine atom.

2. A method of killing mites, which comprises treating the mites with a compound of the formula

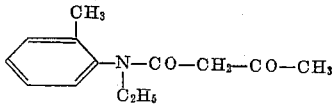

3. A method of killing mites, which comprises treating the mites with a compound of the formula

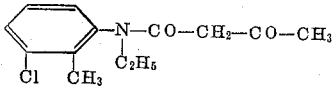

References Cited in the file of this patent

UNITED STATES PATENTS

| | | |
|---|---|---|
| 2,323,938 | Sauer | July 13, 1943 |
| 2,505,682 | Martin et al. | Apr. 25, 1950 |
| 2,734,895 | Zickendrant et al. | Feb. 14, 1956 |

OTHER REFERENCES

Kaslow et al.: J. Am. Chem. Soc., vol. 67 (1945), pp. 1970–1971.

Cook et al.: J. Am. Chem. Soc., vol. 70 (1948), p. 1918.